(12) United States Patent
Lin

(10) Patent No.: US 6,836,812 B2
(45) Date of Patent: Dec. 28, 2004

(54) SEQUENCING METHOD AND BRIDGING SYSTEM FOR ACCESSING SHARED SYSTEM RESOURCES

(75) Inventor: Jeff Lin, Taipei Hsien (TW)

(73) Assignee: Via Technologies, Inc., Taipei Hsien (TW)

( * ) Notice: Subject to any disclaimer, the term of this patent is extended or adjusted under 35 U.S.C. 154(b) by 475 days.

(21) Appl. No.: 09/922,045

(22) Filed: Aug. 3, 2001

(65) Prior Publication Data

US 2002/0019903 A1 Feb. 14, 2002

Related U.S. Application Data

(60) Provisional application No. 60/225,018, filed on Aug. 11, 2000.

(30) Foreign Application Priority Data

Jul. 26, 2001 (TW) .................................. 90118272 A

(51) Int. Cl.$^7$ ............................................... G06F 13/14
(52) U.S. Cl. ....................................... 710/305; 710/309
(58) Field of Search ........................ 710/305–311, 100, 710/316, 29

(56) References Cited

U.S. PATENT DOCUMENTS

| 6,499,079 B1 | * | 12/2002 | Gulick | .................. | 710/305 |
| 2002/0138790 A1 | * | 9/2002 | Nishtala | .................. | 714/43 |

OTHER PUBLICATIONS

Sartori G, "Hypertransport technology: A high bandwidth, low complexity bus architecture", Windows Hardware Engineering Conference, Mar. 2, 2001 (http://www.microsoft.com/whdc/winhec/download/HyperTransport.doc).*

* cited by examiner

Primary Examiner—Khanh Dang
Assistant Examiner—Clifford Knoll
(74) Attorney, Agent, or Firm—J.C. Patents

(57) ABSTRACT

A sequencing method and a bridging system for accessing a shared system resource capable of increasing transmission rate and reducing transmission error when a plurality of master controllers need to access the shared system resource. The sequencing method includes providing each transaction with a transaction identification value and a master identification value. In addition, each master controller is also assigned an access priority.

4 Claims, 3 Drawing Sheets

SEQUENCING METHOD AND BRIDGING SYSTEM FOR ACCESSING SHARED SYSTEM RESOURCES

CROSS-REFERENCE TO RELATED APPLICATION

This application claims the priority benefit of U.S.A provisional application Ser. No. 60/225,018, filed Aug. 11, 2000, and Taiwan application serial no. 90118272, filed Jul. 26, 2001.

BACKGROUND OF THE INVENTION

1. Field of Invention

The present invention relates to a sequencing method for accessing data. More particularly, the present invention relates to a sequencing method for a plurality of master controllers to access a shared resource through a high-speed data bus.

2. Description of Related Art

To access a shared system resource (for example, system memory), master controllers normally rely on a conventional bus such as a PCI bus. FIG. 1 is a schematic diagram showing a conventional system that permits the access of shared data in a system memory by a plurality of master controllers. As shown in FIG. 1, a central processing unit 10 is coupled to a PCI bus 14 through a chipset 12. The PCI bus 14 provides a 32-bit, 33 MHz accessing speed. The PCI bus 14 is also coupled to a plurality of PCI bus compatible master controllers 16 (PCI bus compatible peripheral devices). Each master controller is capable of asserting a request (REQ) signal to request the use of the PCI bus 14. An arbiter inside the chipset 12 arbitrates between incoming requests and asserts grant (GNT) signals to master controllers permitting the use of the PCI bus 14 when appropriate. A master controller receiving full control of the PCI bus 14 may access system memory 11 with the help of the chipset 12. In addition, the system also includes a graphic accelerator 13 connected to an accelerated graphics port (AGP) bus 18 having a 64-bit, 66 MHz accessing speed for rapid display of image data on a display device.

However, most server systems do not require a graphic accelerator for rapid transmission of image data and so most display devices use a PCI bus compatible interface to serve as display devices for showing image data. Consequently, the AGP bus is frequently not fully utilized in the server system. Nonetheless, if the powerful potential of an AGP bus can somehow be tapped so that data is transmitted to the master controllers via the PCI bus rapidly, both resource and system utilization will be increased.

Moreover, a conventional chipset services any request from the PCI bus according to a first-come first-serve principle. Furthermore, data transmission is usually conducted in the same bus transaction cycle immediately after asserting the request. Hence, waiting cycles are needed just to secure the required data. In addition, this arrangement is unable to meet the transmission demands of requests having a higher access priority. Current high-speed bus such as the AGP bus employs a method that treats an access request and a data access separately. A hierarchical pipeline memory write and read operation is also employed to provide high-speed and efficient data transmission. Because each access request has a priority attribute, control chipset must be able to deal with top priority access operations first. The high-speed bus must also include flush and fence signals to ensure proper sequencing of the access operations. However, for a system having a multiple of master controllers all trying to tap into a shared system resource through the high-speed bus, sequencing of requests becomes a big issue.

SUMMARY OF THE INVENTION

Accordingly, one object of the present invention is to provide a sequencing method such that the requests for accessing a shared system resource from a multiple of master controllers are prioritized.

To achieve these and other advantages and in accordance with the purpose of the invention, as embodied and broadly described herein, the invention provides a sequencing method for prioritizing requests from a multiple of master controller. First, a transaction identification value is provided for each transaction so that the performance of each transaction is ordered. A master identification value is also provided for each transaction to serve as a label for identifying the initiating master controller. Finally, transactions having identical master identification value are collected and the transactions are prioritized according to their transaction identification value.

This invention also provides a bridging system for accessing a shared system resource. The bridging system includes a plurality of master controllers, a first bus, a bridging device, a second bus and a chipset. Each master controller is capable of submitting a multiple of write transactions and a multiple of read transactions. The first bus is coupled to the master controllers. The bridging device is coupled to the first bus for re-directing reading transactions or writing transactions. The second bus is coupled to the bridging device. The chipset is coupled to the second bus and the shared system resource for picking up a reading transaction or a writing transaction submitted by a specified master controller and accessing the corresponding shared system resource.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
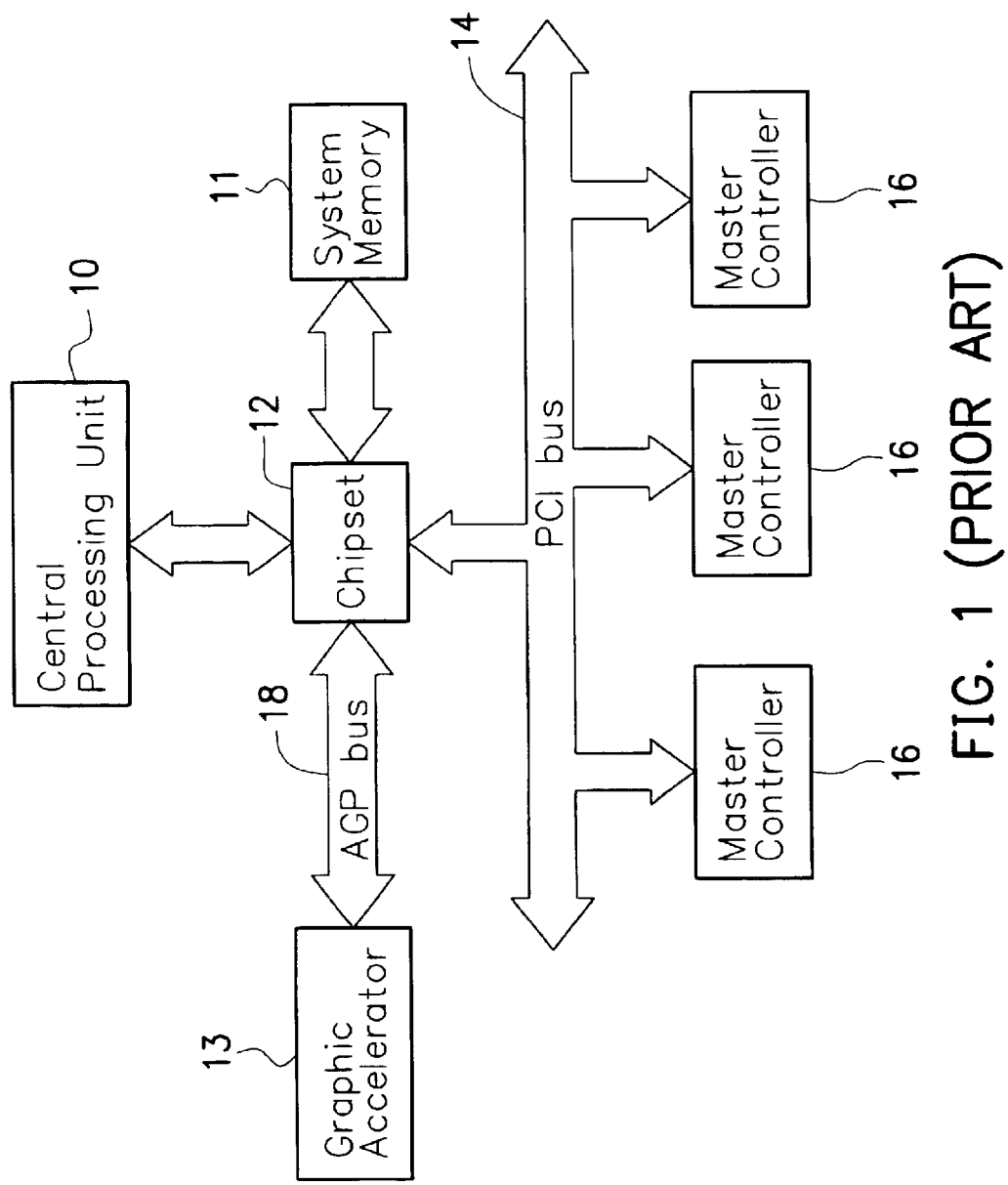
FIG. 1 is a schematic diagram showing a conventional system that permits the access of shared data in a system memory by a plurality of master controllers.

Reference will now be made in detail to the present preferred embodiments of the invention, examples of which are illustrated in the accompanying drawings. Wherever possible, the same reference numbers are used in the drawings and the description to refer to the same or like parts.

Figure 2:
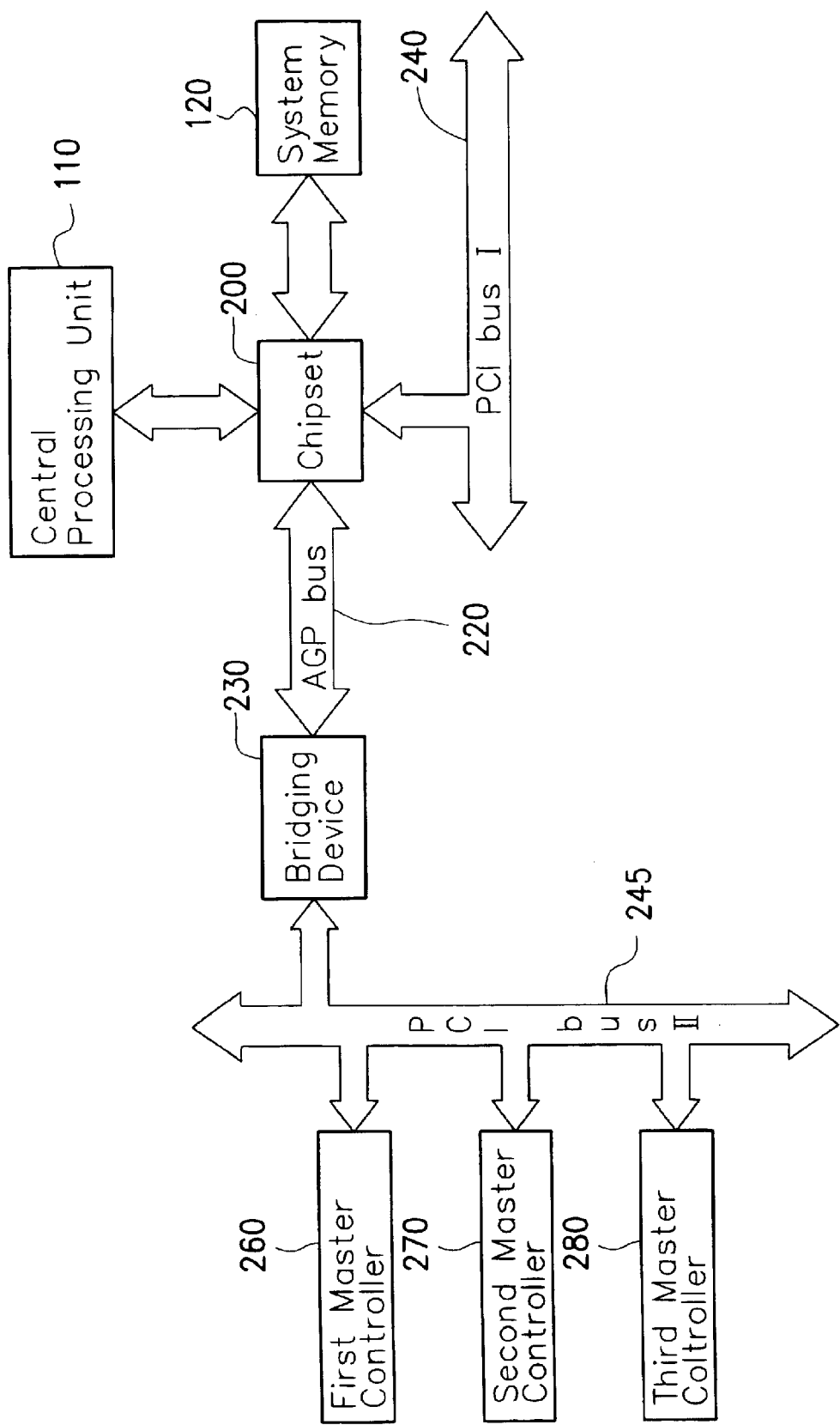
FIG. 2 is a schematic diagram showing a system capable of accessing a shared memory through an AGP bus according to one preferred embodiment of this invention.

FIG. 2 is a schematic diagram showing a system capable of accessing a shared memory through an AGP bus according to one preferred embodiment of this invention. As shown in FIG. 2, a chipset 200 is coupled to a central processing unit 110 and a system memory 120. The chipset 200 includes a PCI bus I 240 that provides a 32-bit, 33 MHz data accessing speed. This invention also includes an accelerated graphic port (AGP) bus 220 that couples with a second PCI bus II 245 via a bridging device 230. Three master controllers 260, 270 and 280 are coupled to the PCI bus II 245 so that data transactions with the system memory 120 can be conducted via the AGP bus 220 and the chipset 230. Obviously, the number of master controllers attached to the PCI bus II 245 is unlimited. Three master controllers are shown only as an example.

Since the AGP bus provides a 64-bit, 66 MHz data accessing speed, the PCI bus II 245 can service faster PCI compatible master controllers. Thus, the PCI bus II is able to increase the overall operating speed of the entire system.

When any one of the master controllers needs to initiate a data transaction, the master controller first asserts a request signal to the PCI bus II 245. After receiving a grant, data is transferred to a write or read waiting queue inside the chipset 200 via the bridging device 230 and the AGP bus 220. The data must be queued because the initiating master controller is not the sole user of the shared system memory. In general, no matter how many master controllers there is and no matter which master controller asserts the access request, all data transactions must be submitted to the waiting queue before accessing the shared system memory 120.

Because the PCI bus II 245 is attached to a plurality of peripheral devices (master controllers 260), all data transactions are first dumped inside waiting queues inside the chipset 200. These data transactions must be sequenced and prioritized to avoid data access errors. The following describes a method of sequencing and prioritizing data transactions.

To begin the sequencing, each transaction is assigned a master identification (Master ID) value to label the initiating peripheral device (master controller). Furthermore, each transaction is also provided with a transaction identification (transaction ID) value according to its attribute such as a write transaction or a read transaction.

Transaction is sequenced according to current transaction attribute and attribute of previous transaction (in the following, R indicates a read transaction and W indicates a write transaction). The first transaction is assigned a transaction ID value 0. If the current transaction is R and the previous transaction is also R, a 1 is added to the transaction ID value. If the current transaction is R and the previous transaction is W, a 0 is added to the transaction ID value. If the current transaction is W and the previous transaction is R, a 1 is added to the transaction ID value. Finally, if the current transaction is W and the previous transaction is also W, a 0 is added to the transaction ID value.

For example, if the PCI bus II has three master controllers and order of data transactions submitted to the chipset through the bridging device is R2-R1-R2-R3-W1-W2-R1-W1-R1-R 3-W2-W2-R2-W3-W3-R3 (the number after the alphabet indicates the specific peripheral device, in other words, encoded value of the master controller). In other words, the first transaction is a read (R) initiated by the second peripheral device (the master ID value is 2) and the transaction ID is 0. The second transaction is also a read (R) initiated by the first peripheral device (the master ID value is 1) and a 1 is added to the previous transaction ID to produce a new transaction ID value of 1. The third transaction is also a read (R) initiated by the second peripheral device (the master ID value is 2) and a 1 is added to the previous transaction ID to produce a new transaction ID having a value of 2. The fourth transaction is also a read (R) initiated by the third peripheral device (the master ID value is 3) and a 1 is added to the previous transaction ID to produce a new transaction ID having a value of 3. The fifth transaction is also a write (W) initiated by the first peripheral device (the master ID value is 1) and a 1 is added to the previous transaction ID to produce a new transaction ID having a value of 4. The sixth transaction is also a write (W) initiated by the second peripheral device (the master ID value is 2) and a 0 is added to the previous transaction ID to produce a new transaction ID having a value of 4. The seventh transaction is a read (R) initiated by the first peripheral device (the master ID value is 1) and a 0 is added to the previous transaction ID to produce a new transaction ID having a value of 4. Following similar line of processing, a transaction ID sequence of 0-1-2-3-4-4-4-5-5-6-7-7-7-8-8-8 is obtained.

Figure 3:
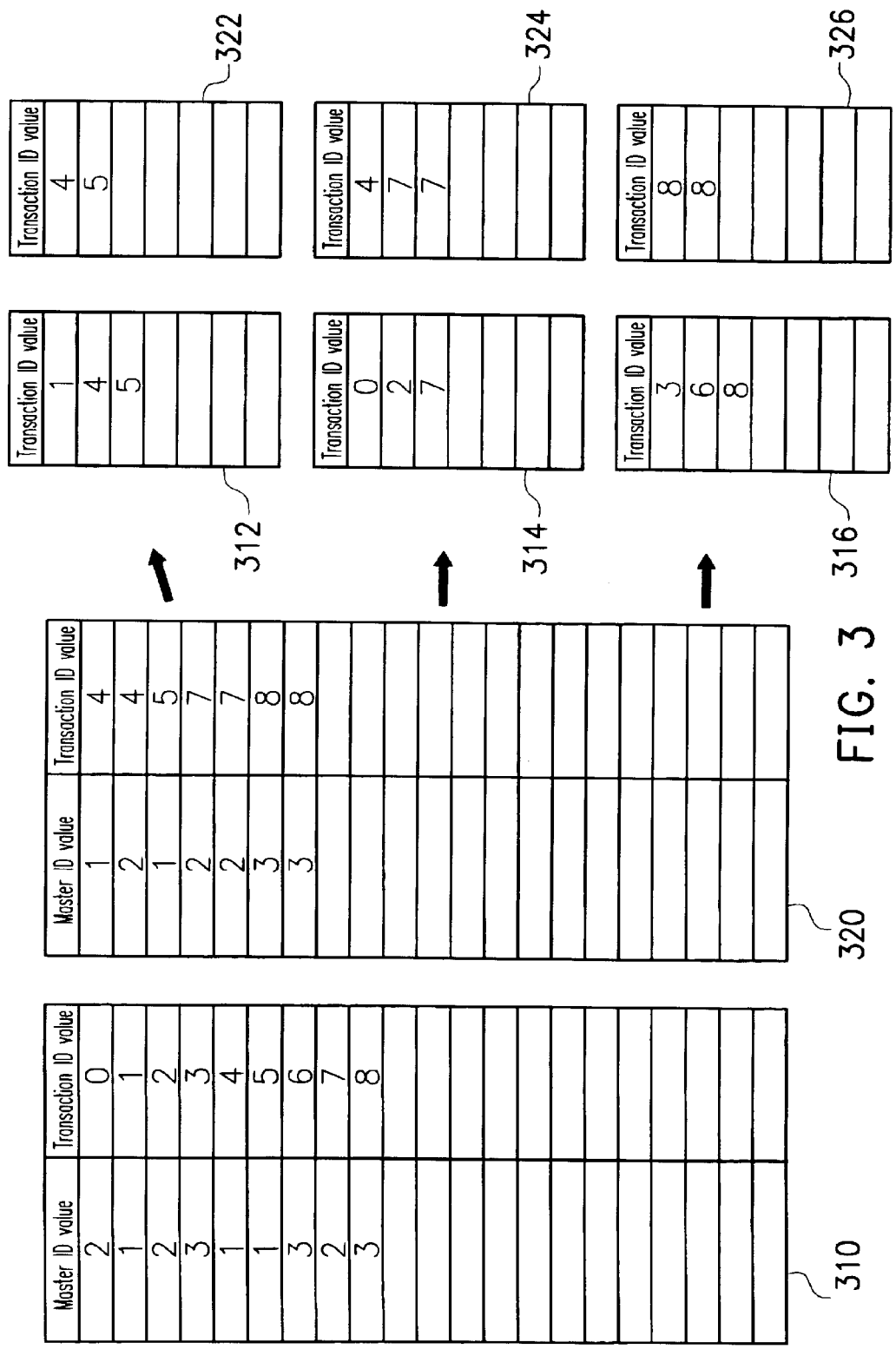
FIG. 3 is a series of tables showing the sequencing of transaction queues inside a control chipset according to one preferred embodiment of this invention.

FIG. 3 is a series of tables listing out the write waiting queues and the read waiting queues inside a control chipset according to the aforementioned embodiment of this invention. Transaction transferred from the AGP bus is separated out and dumped into a read queue 310 or a write queue 320 according to its attribute. Aside from address and data (not shown) necessary for the transaction, the read queue 310 and the write queue 320 inside the chipset must hold the master ID value and the transaction ID value of the particular transaction. According to the master ID value, the chipset puts the content of the read queue 310 and the write queue 320 into different master controller read queue and write queue. In this embodiment, the first controller read queue 312 and write queue 322 hold the read transactions and write transactions having a master ID value 1. Similarly, the second controller read queue 314 and write queue 324 hold the read transactions and write transactions having a master ID value 2. Finally, the third controller read queue 316 and write queue 326 hold the read transactions and write transactions having a master ID value 3.

As shown in FIG. 3, transactions submitted by various master controllers are categorized. Thereafter, transactions between the master controllers and the system memory are conducted according to priority setting of each master controller.

The transaction sequence between a particular master controller and the system memory is determined according to the transaction ID value. For example, the first master controller read queue 312 contains read transaction ID values 1, 4 and 5 and the first master controller write queue 322 contains write transaction ID values 4 and 5. For transactions between the first master controller and the system memory, the transaction having the smallest transaction ID value is conducted first. Hence, the read (R) having a transaction ID value 1 transacts with the system memory first. If the transaction ID value inside the first read queue 312 and write queue 322 are identical, write (W) is executed first. The transaction sequence between the first master controller and the system memory is R-W-R-W-R. Hence, incorrect sequencing of transactions initiated by the first master controller is prevented even though the transactions are placed in separate read queue and write queue. Similarly, the transaction sequence between the second master controller and the system memory is R-R-W-W-W-R while the transaction sequence between the third master controller and the system memory is R-R-W-W-R.

Since each master controller has an individual priority, the chipset may prioritize and execute transactions accordingly.

According to the sequencing method of this invention, transaction is properly sequencing so that erroneous data read/write transactions are entirely avoided.

This invention utilizes the high-speed AGP bus 220 to achieve a higher data transmission rate between a multiple of master controllers (260, 270 and 280) and the shared memory 110. This invention also supports flush and fence commands provided by the AGP bus 220. In addition, transaction ID attributes are also used to sequence transactions. On receiving a flush command, all low priority transactions are executed before continuing with subsequent transactions. On receiving a fence command, all grants to transactions coming after the fence command are withheld until all transactions before the fence command are executed.

Anyone familiar with the technologies may know that the master controllers are coupled to the PCI bus. However, this invention is not restricted to a PCI bus. In fact, a bus is not absolutely necessary. The plurality of master controllers may couple directly with the bridging device as long as an operating scheme for the master controllers is provided. Furthermore, sequencing in this invention is not limited to the transaction ID value. Any transaction sequencing method having a transaction ID is within the scope of this invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A sequencing method for accessing shared system resources capable of determining the priority of transactions initiated by a plurality of master controllers, comprising the steps of:

providing each transaction with a transaction identification value to determine an order of execution of each transaction;

providing each transaction with a master identification value to label the initiating master controller of each transaction; and gathering transactions having an identical master identification value and accessing the shared system resource in sequence according to the transaction identification value, comprising the steps of:

picking up the transaction having the smallest transaction identification value and executing the transaction to access the shared system resource; and executing the write transactions to access the shared system resource before the read transactions if two or more transactions have the same smallest transaction identification value.

2. The method of claim 1, wherein the transactions include write transactions and read transactions.

3. The method of claim 2, wherein the step of providing each transaction with the transaction identification value includes the sub-steps of:

providing the first transaction with the transaction identification value of 0;

adding 1 to the transaction identification value when the previous transaction of the read transaction is another read transaction;

adding 0 to the transaction identification value when the previous transaction of the read transaction is a write transaction;

adding 1 to the transaction identification value when the previous transaction of the write transaction is a read transaction;

adding 0 to the transaction identification value when the previous transaction of the write transaction is another write transaction.

4. The method of claim 1, wherein the sequencing method also incorporates a flush and a fence signal provided by an accelerated graphic port (AGP) bus to ensure proper transaction execution sequence.

* * * * *